(12) United States Patent
Horiuchi et al.

(10) Patent No.: US 7,587,124 B2
(45) Date of Patent: Sep. 8, 2009

(54) APPARATUS, METHOD, AND COMPUTER PRODUCT FOR RECOGNIZING VIDEO CONTENTS, AND FOR VIDEO RECORDING

(75) Inventors: Naoaki Horiuchi, Tsurugashima (JP); Shinichi Gayama, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 778 days.

(21) Appl. No.: 11/033,972

(22) Filed: Jan. 13, 2005

(65) Prior Publication Data

US 2005/0183016 A1 Aug. 18, 2005

(30) Foreign Application Priority Data

Jan. 20, 2004 (JP) .............................. 2004-012404

(51) Int. Cl.
*H04N 5/91* (2006.01)
*H04N 5/00* (2006.01)
*H04N 5/14* (2006.01)
*H04N 9/64* (2006.01)

(52) U.S. Cl. .............................. 386/69; 386/68; 386/95; 386/125; 386/126; 348/700; 348/701

(58) Field of Classification Search ......... 386/125–126, 386/68–69, 95; 345/473; 375/240.08; 348/700–701
See application file for complete search history.

(56) References Cited

U.S. PATENT DOCUMENTS 5,537,530 A * 7/1996 Edgar et al. .................. 715/723

7,027,508 B2 * 4/2006 Shibata et al. ......... 375/240.08
2005/0180580 A1 8/2005 Murabayashi et al.

FOREIGN PATENT DOCUMENTS

| JP | 6-309733 A | 11/1994 |
|---|---|---|
| WO | WO 00/04498 A1 | 1/2000 |
| WO | WO 03/065711 A1 | 8/2003 |

OTHER PUBLICATIONS

Y. Zhuang et al., "Adaptive Key Frame Extraction Using Unsupervised Clustering", IEEE Comput. Soc. US, vol. 1, 1998, pp. 866-870, XP10308833.

* cited by examiner

*Primary Examiner*—Thai Tran
*Assistant Examiner*—Daquan Zhao
(74) *Attorney, Agent, or Firm*—Foley & Lardner LLP

(57) ABSTRACT

An apparatus for recognizing contents of a video made of picture frames includes a splitting unit that splits the picture frames into a plurality of sets of video shots based on cut points indicating a change of screen; a similar-video-shot extracting unit that extracts video shots similar to each of the video shots from among the sets of video shots; a maximum-count-video-shot extracting unit that counts a number of similar video shots for each of the video shots and extracts a maximum count video shot having a maximum count of the similar video shots; and a representative-video-shot determining unit that takes the maximum count video shot as a representative video shot for the video.

9 Claims, 13 Drawing Sheets

APPARATUS, METHOD, AND COMPUTER PRODUCT FOR RECOGNIZING VIDEO CONTENTS, AND FOR VIDEO RECORDING

BACKGROUND OF THE INVENTION

1) Field of the Invention

The present invention relates to a technology for recognizing contents of a video and a technology for recording a video.

2) Description of the Related Art

A programmed recording device records video images of a program at a scheduled time. Such a programmed recording device recognizes contents of a video that is being recorded from various features of the video image and based on those features, recognizes whether the program that is being recorded has been prolonged. If so, it alters the starting and ending of recording.

A typical conventional programmed recording device includes a video-content recognizing unit, a program information setting unit, which sets information related to programs intended to be recorded, and a recording time control unit, which collates the contents recognized by the video-content recognizing unit and the information set by the program information setting unit and controls the starting and ending of a recording. The video-content recognizing unit includes a feature detecting unit, which detects features of image signals, a knowledge base unit, which contains a knowledge base related to the features of the image content, and a feature verifying unit, which collates the detected features and the knowledge base.

Such a conventional technology has been disclosed in, for example, Japanese Patent Laid-Open Publication No. H6-309733.

However, in the conventional programmed recording devices, the knowledge base unit, which contains the knowledge base related to the features of the video image content, has to be prepared in advance. As a result, it is difficult to provide feature data of video image contents related to a new program. Consequently, the accuracy of feature detection from the video image content becomes low, leading to a failure to record a new program.

For example, assume programmed recording has been set for a relay of a baseball match. When the knowledge base unit receives new video image signals such as when a baseball match is relayed from a different stadium, the uniform of the baseball team has changed, or the screen layout of the broadcasting station relaying the match changes, etc., these signals are not recognized as video image contents of the baseball relay scheduled to be recorded. As a result, no recording is performed.

One approach to enhance the accuracy is to update the contents of the knowledge base unit. However, with a current trend towards multi-channel broadcasting, the quantity of data involved and the frequency of data updating will become inordinately large and the volume of parameter data of the knowledge base unit will also increase. The increased parameter data results in a higher probability of erroneous detection, which decreases the accuracy of detection.

SUMMARY OF THE INVENTION

It is an object of the present invention to solve at least the problems in the conventional technology.

An apparatus for recognizing contents of a video according to one aspect of the present invention includes a splitting unit that splits picture frames into a plurality of sets of video shots based on cut points, each cut point indicating a change of screen; a similar-video-shot extracting unit that extracts similar video shots that are similar to each of the video shots from among the sets of video shots; a maximum-count-video-shot extracting unit that counts a number of similar video shots for each of the video shots and extracts a maximum count video shot that has a maximum count of the similar video shots; and a representative-video-shot determining unit that takes the maximum count video shot as a representative video shot representing the contents of the video.

A recording apparatus according to another aspect of the present invention includes a video-content recognizing apparatus for recognizing contents of a video made of picture frames; a recording-information input unit that receives an input of recording information including date of broadcasting, broadcasting start time, and broadcasting duration of a program intended for recording; a recording unit that records a video of a program; and a recording control unit that controls the recording unit and records the video of the program set in the recording information input by the recording-information input unit. The video-content recognizing apparatus includes a splitting unit that splits the picture frames into a plurality of sets of video shots based on cut points, each cut point indicating a change of screen; a similar-video-shot extracting unit that extracts similar video shots that are similar to each of the video shots from among the sets of video shots; a maximum-count-video-shot extracting unit that counts a number of similar video shots for each of the video shots and extracts a maximum count video shot that has a maximum count of the similar video shots; and a representative-video-shot determining unit that takes the maximum count video shot as a representative video shot representing the contents of the video. The video-content recognizing apparatus determines the representative video shot representing the video content of the program set in the recording information based on the sequence of picture frames portraying the content of the program. The recording control unit ends the recording set in the recording information based on a result of the representative-video-shot determination by the video-content recognizing apparatus.

A recording apparatus according still another aspect of the present invention includes a video-content recognizing apparatus for recognizing contents of a video made of picture frames; a recording-information input unit that receives an input of recording information including date of broadcasting, broadcasting start time, and broadcasting duration of a program intended for recording; a recording unit that records a video of a program; and a recording control unit that controls the recording unit and records the video of the program set in the recording information input by the recording-information input unit. The video-content recognizing apparatus includes a splitting unit that splits the picture frames into a plurality of sets of video shots based on cut points, each cut point indicating a change of screen; a similar-video-shot extracting unit that extracts similar video shots that are similar to each of the video shots from among the sets of video shots; a maximum-count-video-shot extracting unit that counts a number of similar video shots for each of the video shots and extracts a maximum count video shot that has a maximum count of the similar video shots; a representative-video-shot determining unit that takes the maximum count video shot as a representative video shot representing the contents of the video; and a video-content recognizing unit that recognizes whether the video content of a second sequence of picture frames is similar to the video content of the representative video shot. The splitting unit splits the second sequence of picture frames into a second set of video shots that include picture frames delimited by cut points, each cut point indicating a change of screen. The video-content recognizing unit recognizes whether the video content of the second sequence of picture frames is similar to the video content of the representative video shot based on the video shot of the representative video shot and the second set of video shots. The video-content recognizing apparatus determines the representative video shot representing the video content of the program set in the recording information based on the first sequence of picture frames portraying the content of the program. The recording control unit records the second sequence of picture frames input within a predetermined duration after the broadcasting duration of the program set in the recording information has elapsed if the video-content recognizing apparatus is able to determine the representative video shot representing the program set in the recording information.

A recording apparatus according to still another aspect of the present invention includes a video-content recognizing apparatus for recognizing contents of a video made of picture frames; a recording-information input unit that receives an input of recording information including date of broadcasting, broadcasting start time, and broadcasting duration of a program intended for recording; a recording unit that records a video of a program; and a recording control unit that controls the recording unit and records the video of the program set in the recording information input by the recording-information input unit. The video-content recognizing apparatus includes a splitting unit that splits the picture frames into a plurality of sets of video shots based on cut points, each cut point indicating a change of screen; a similar-video-shot extracting unit that extracts similar video shots that are similar to each of the video shots from among the sets of video shots; a maximum-count-video-shot extracting unit that counts a number of similar video shots for each of the video shots and extracts a maximum count video shot that has a maximum count of the similar video shots; and a representative-video-shot determining unit that takes the maximum count video shot as a representative video shot representing the contents of the video. The recording-information input unit additionally receives the input of program information pertaining to a program preceding the program intended for recording. The video-content recognizing apparatus determines the representative video shot representing the video content of the program set in the recording information based on the sequence of picture frames portraying the content of the preceding program. The recording control unit ends the recording set in the recording information based on a result of the representative-video-shot determination by the video-content recognizing apparatus.

A method of recognizing contents of a video according to still another aspect of the present invention includes splitting picture frames into a plurality of sets of video shots based on cut points, each cut point indicating a change of screen; extracting similar video shots that are similar to each of the video shots from among the sets of video shots; counting a number of similar video shots for each of the video shots and extracting a maximum count video shot that has a maximum count of the similar video shots; and making the maximum count video shot as a representative video shot that represents the contents of the video.

A method of recording a video according to still another aspect of the present invention includes inputting recording information including date of broadcasting, broadcasting start time, and broadcasting duration of a program intended for recording; starting recording of a video of the program; splitting picture frames of the video into a plurality of sets of video shots based on cut points, each cut point indicating a change of screen; extracting similar video shots that are similar to each of the video shots split from among the sets of video shots; counting a number of similar video shots for each of the video shots and extracting a maximum count video shot that has the maximum number of similar video shots; making the maximum count video shot as a representative video shot; and ending the recording based on the representative video shot.

A computer readable recording medium according to still another aspect of the present invention stores a computer program that causes a computer to execute the above method of recognizing contents of a video according to the present invention.

A computer readable recording medium according to still another aspect of the present invention stores a computer program that causes a computer to execute the above method of recording a video according to the present invention.

The other objects, features and advantages of the present invention are specifically set forth in or will become apparent from the following detailed descriptions of the invention when read in conjunction with the accompanying drawings.

DETAILED DESCRIPTION

Exemplary embodiments of an apparatus, a method, and a computer program for recognizing contents of a video, and an apparatus, a method, and a computer product for recording a video are explained below with reference to the accompanying drawings.

Figure 1:
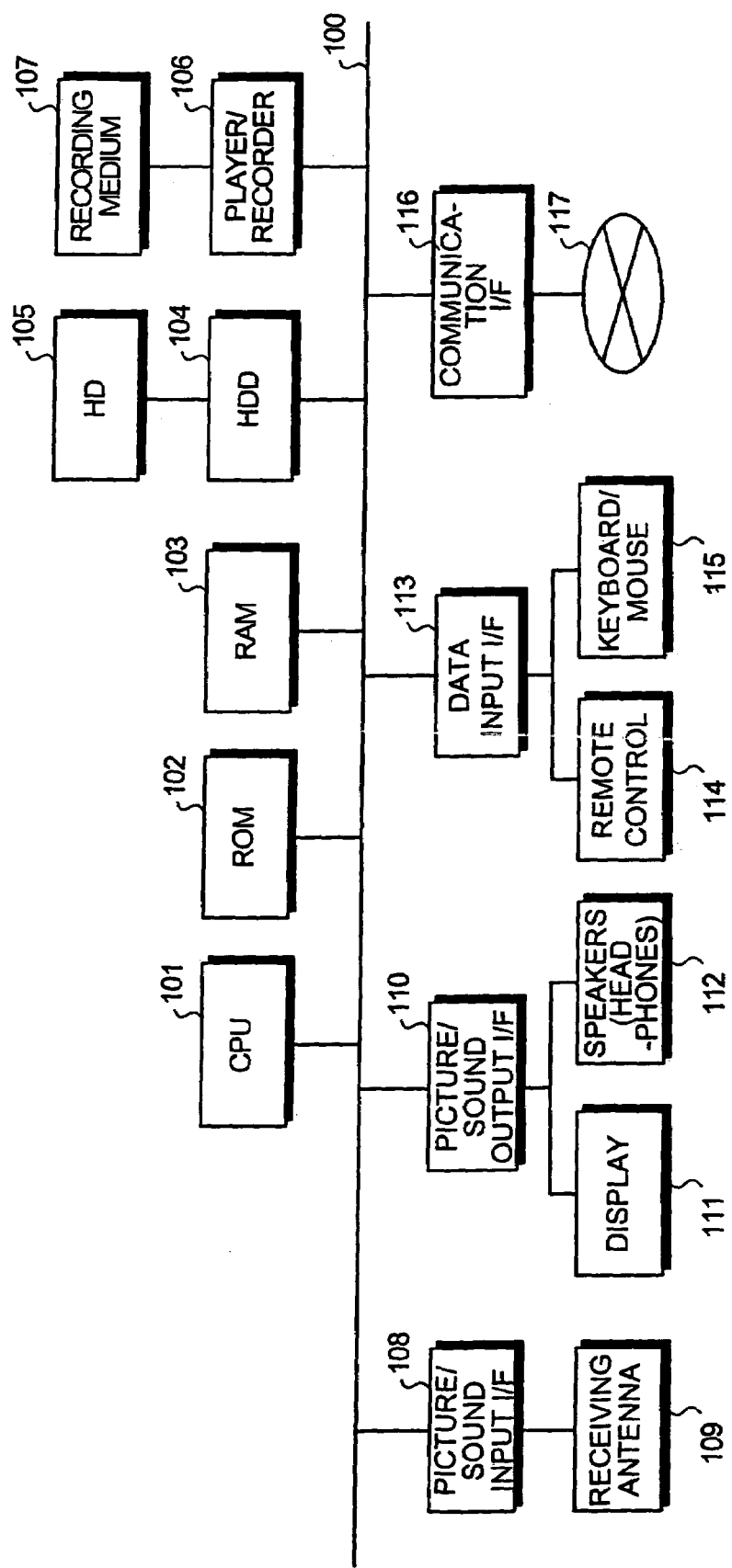
FIG. 1 is a hardware configuration of a video-content recognizing apparatus and a recording apparatus according to an embodiment of the present invention.

A hardware configuration of the video-content recognizing apparatus and recording apparatus according to an embodiment of the present invention is explained next. FIG. 1 is a hardware configuration of the video-content recognizing apparatus and the recording apparatus according to an embodiment of the present invention.

The video-content recognizing apparatus and recording apparatus includes a central processing unit (CPU) 101, a read-only memory (ROM) 102, a random access memory (RAM) 103, a hard disk drive (HDD) 104, a hard disk (HD) 105, a player/recorder 106, a removable recording medium 107, a picture/sound input interface 108, a receiving antenna 109, a picture/sound output interface 110, a display 111, speakers (or headphones) 112, data input interface 113, a remote control 114, a keyboard/mouse 115, a communication interface 116, and a bus 100 connecting all the parts mentioned above.

The CPU 101 controls the entire video-content recognizing apparatus and the recording apparatus. The ROM 102 stores programs, such as a boot program. The CPU 101 uses the RAM 103 as a work area. The HDD 104 reads data from and writes data to the HD 105 under the control of CPU 101. The HD 105, under the control HDD 104, stores the data written to it.

The player/recorder 106 plays data from/records data to the recording medium 107 under the control of the CPU 101. The recording medium 107 is removable from the player/recorder 106. Under the control of the player/recorder 106, data can be read from or written to the recording medium 107. Examples of the recording medium include a compact disk (CD), a compact disk-recordable (CD-R), a compact disk-read-only memory (CD-ROM), a digital versatile disk (DVD), a digital versatile disk recordable (DVD-R), a DVD+R, a DVD Rewritable (DVD-RW), a DVD+RW, a magneto optical (MO), a flash memory card, a video tape, HD 105, etc.

The picture/sound input I/F 108 input the picture and sound received by the receiving antenna 109. The picture/sound output I/F 110 is connected to the display 111, which displays the picture, and the speakers (or headphones) 112, which output the sound. The display 111 displays various types of data such as icons, cursors, menu, windows, text, images, etc. The display 111 may be, for example, a cathode-ray tube (CRT), a thin-film transistor (TFT) liquid crystal display, a plasma display, etc.

The data input I/F 113 inputs the data that is input with the aid of the remote control 114, which is equipped with a plurality of keys for inputting text, numerals, instructions, etc., and the keyboard/mouse 115. Examples of data that may be input are power ON/OFF, channel setting, information pertaining to programmed recording, etc. The communication I/F 116 inputs various data such as picture data, sound data, electronic program guide data, etc. from a network 117. Examples of the network 117 include a local area network (LAN), a wide area network (WAN), the Internet, etc.

Figure 2:
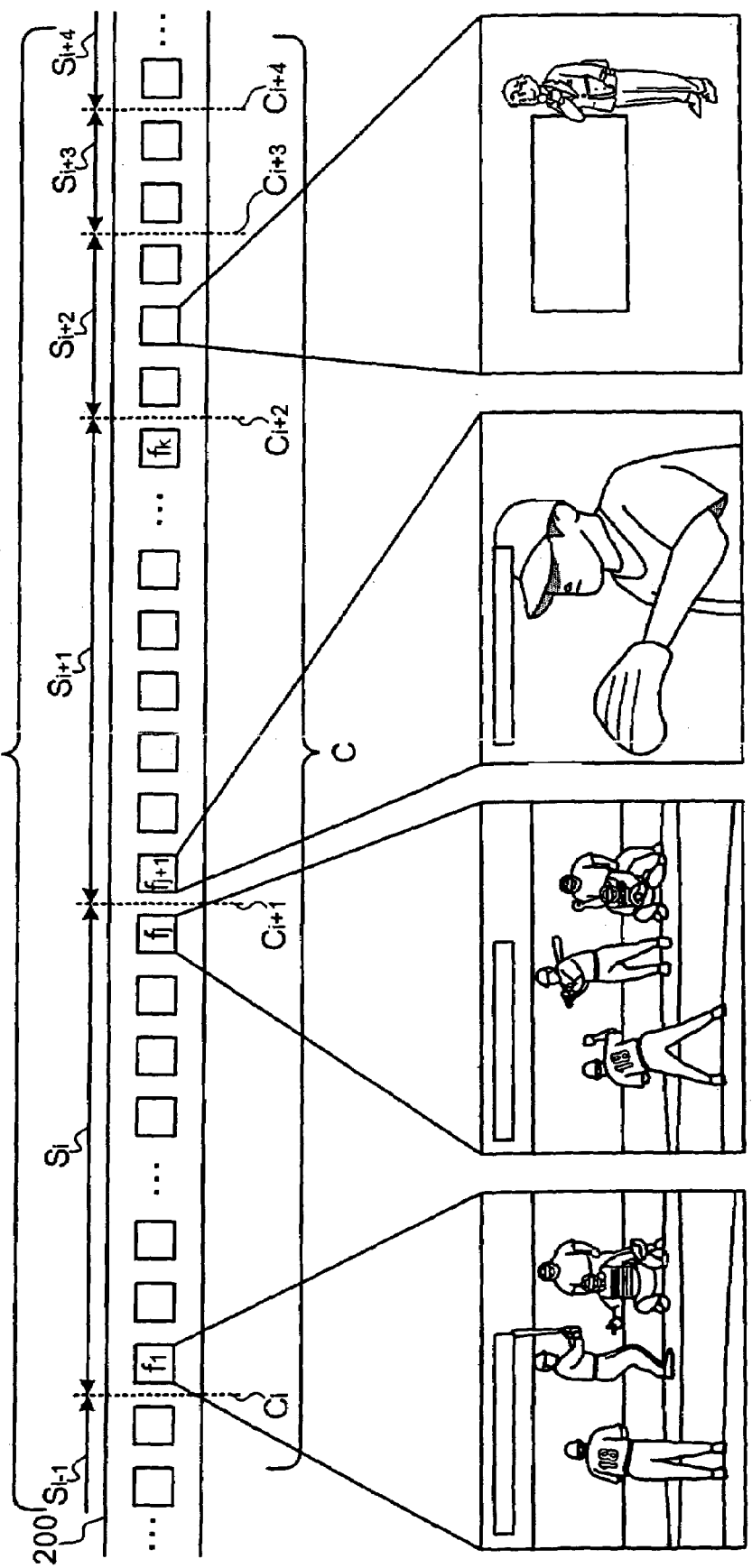
FIG. 2 is a sequence of picture frames input into the video-content recognizing apparatus and the recording apparatus.

A sequence of picture frames that is input into the video-content recognizing apparatus and the recording apparatus is explained next. FIG. 2 is a sequence of picture frames that is input into the video-content recognizing apparatus and the recording apparatus.

A sequence of picture frames 200 portraying a certain video content is sequentially input from the picture/sound input I/F 108 or the communication I/F shown in FIG. 1. The video content of the sequence of picture frames 200 portrays a baseball relay. The sequence of picture frames 200 is made of a plurality of video shots $S_i$ (i=1 to n). The video shot $S_i$ is made of a set of continuous picture frames between two cut points $C_i$ (i=1 to n+1), where the cut point $C_i$ represents a major change in the screen.

For example, the video shot $S_i$, which is made of a continuous sequence of picture frames $f_1$ through $f_j$, is shot by a centrally located camera. The subsequent video shot $S_{i+2}$, which is made of a sequence of picture frames $f_{j+1}$ through $f_k$, is shot by a camera located elsewhere. The next video shot $S_{i+2}$ represents a commercial.

Figure 3:
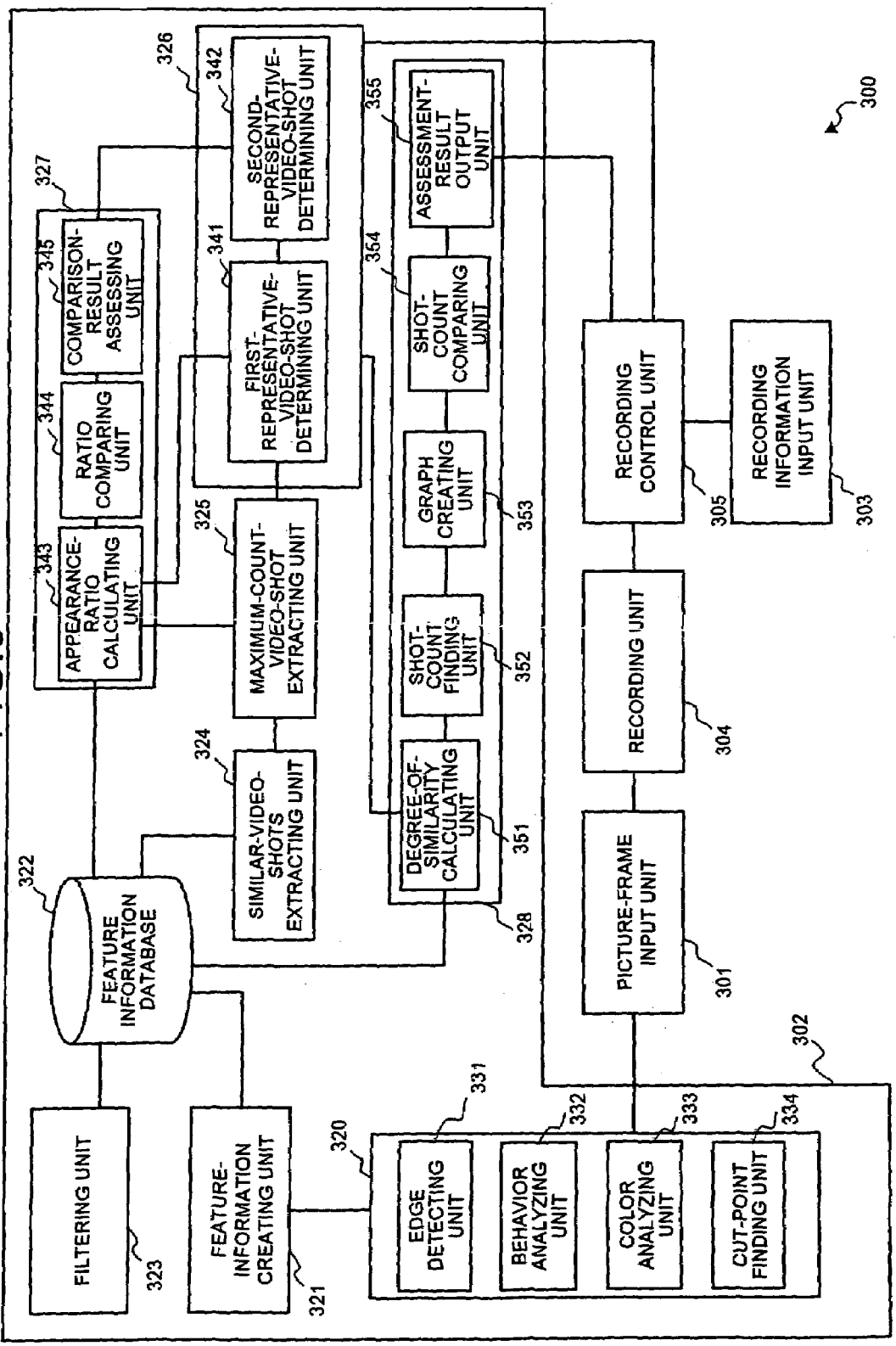
FIG. 3 is a block diagram of a functional configuration of the video-content recognizing apparatus and the recording apparatus.

A functional configuration of the video-content recognizing apparatus and the recording apparatus according to the present invention is explained next. FIG. 3 is a block diagram of a functional configuration of the video-content recognizing apparatus and the recording apparatus.

A recording apparatus 300 includes a picture frame input unit 301, a video-content recognizing apparatus 302, a recording-information input unit 303, a recording unit 304, and a recording control unit 305. The picture frame input unit 301 receives the input of, for example, the continuous sequence of picture frames 200. The function of the frame image input unit 301 can be realized with the aid of the picture/sound input I/F 108 or the communication I/F 116 shown in FIG. 1.

A functional configuration of the video-content recognizing apparatus 302 is explained next. The video-content recognizing apparatus 302 includes a splitting unit 320, a feature information creating unit 321, a feature information database 322, a filtering unit 323, a similar-video-shot extracting unit 324, a maximum-count-video-shot extracting unit 325, a representative-video-shot determining unit 326, an assessing unit 327, and a video-content recognizing unit 328.

The splitting unit 320 splits the sequence of picture frames input from the picture frame input unit 301 into video shots made of picture frames delimited by the cut points where the video content changes. In particular, the splitting unit 320 splits the sequence of picture frames 200 shown in FIG. 2 into a plurality of video shots $S_i$.

The splitting unit 320 includes an edge detecting unit 331, a behavior analyzing unit 332, a color analyzing unit 333, and a cut point finding unit 334. The edge detecting unit 331 detects edges of objects in each of the series of picture frames input from the picture frame input unit 301. Examples of an object include the players, the referee, the ground, the back net, etc. in the picture frame $f_1$ in FIG. 2.

The behavior analyzing unit 332 analyzes the behavior of objects by comparing the edges of the picture frame detected by the edge detecting unit 331 with the edges of another picture frame. For instance, in the video shot $S_i$ in FIG. 2, the edges of the dynamic objects, such as the players and the referee, shift either partly or fully. On the other hand, static objects, such as the ground or the back net, do not shift.

Upon exceeding the cut point $C_{i+1}$, the behavior information undergoes a significant change as the objects, whose edges are detected by the edge detecting unit 331, change significantly to the objects in the next video shot $S_{i+1}$. When a movie is compressed using the Moving Picture Experts Group (MPEG) compression format, the behavior analyzing unit 332 analyzes the behavior of a video shot S with the aid of the picture frames and motion vector.

The color analyzing unit 333 analyzes the colors in each of the picture frames. In particular, the color analyzing unit 333 calculates the color information for each picture frame in a YUV format, Y representing the brightness signal, U representing the difference between the brightness signal and the red component, and V representing the difference between the brightness signal and the blue component. In the video shot $S_i$, the color information does not vary much because the same objects are present in each of the picture frames. However, the color information changes significantly for the next video shot $S_{i+1}$.

The cut point finding unit 334 compares two consecutive picture frames and recognizes the cut point C, which represent the point where the video content changes. In particular, the cut point finding unit 334 recognizes a cut point C between two consecutive picture frames when the difference in the color information or the behavior information of the two frames exceeds a predetermined threshold.

For example, the cut point finding unit 334 compares the color information and the behavior information of the consecutive picture frames $f_j$ and $f_{j+1}$ and, if the difference exceeds a preset threshold, assesses that the video shot S has changed from the video shot $S_i$ to the video shot $S_{j+1}$. The cut point finding unit 334 recognizes the picture frame $f_j$, which precedes the cut point $C_{i+1}$, as the last frame of the video shot $S_i$ and the picture frame $f_{j+1}$, which follows the cut point $C_{i+1}$, as the first frame of the video shot $S_{i+1}$.

Thus, by the recognition of the cut point C, the sequence of picture frames 200 input from the picture frame input unit 301 is split into video shots S made of a sequence of picture frames delimited by cut points C, which represent the points where the screen changes. The CPU 101 realizes the function of the splitting unit 320 by executing the program stored in the recording medium, such as the ROM 102, RAM 103, HD 105, etc. shown in FIG. 1.

Figure 4:
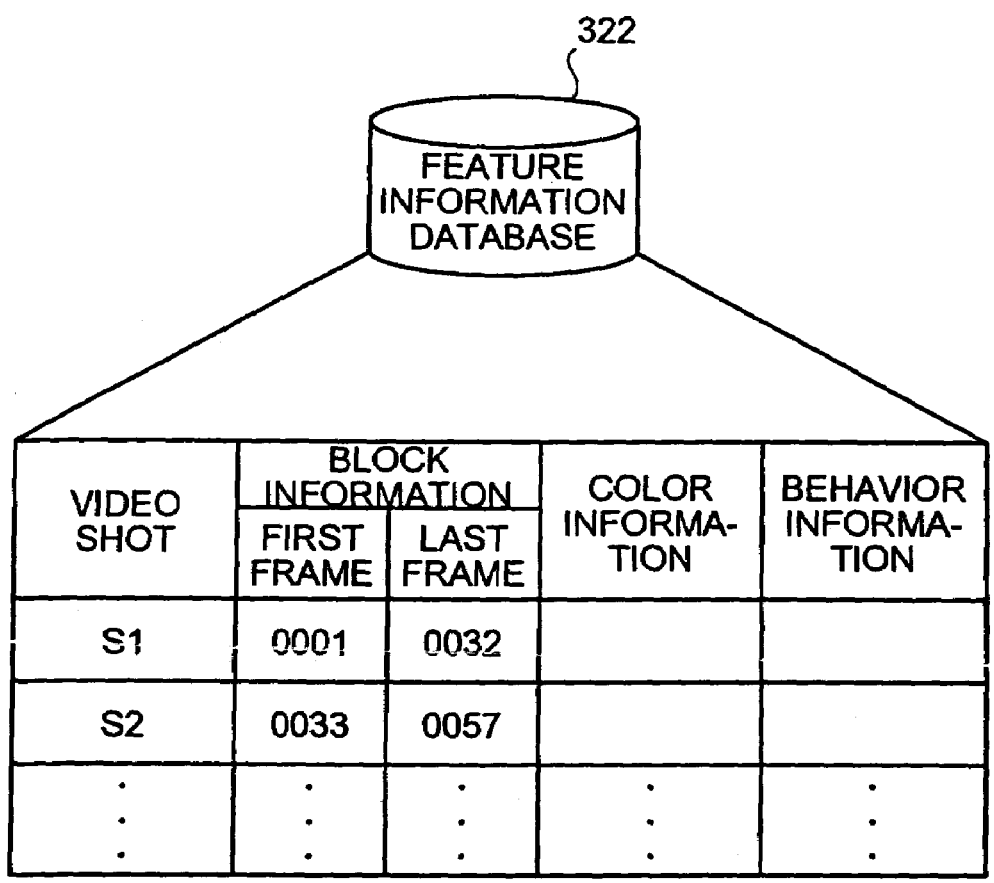
FIG. 4 is a schematic for explaining the contents of the feature information database shown in FIG. 3.

The feature information creating unit 321 creates feature information indicating the feature of each of the video shots S split by the splitting unit 320. The feature information database 322 stores the feature information created by the feature information creating unit 321. FIG. 4 is a drawing of the contents of the feature information database 322.

In particular, the feature information includes block information, which includes the first frame and the last frame, of each video shot S, the color information of each video shot obtained by averaging out the color information of all the picture frames in the video shot, and the behavior information of each video shot obtained by averaging out the behavior information of all the picture frames in the video shot. The CPU 101 realizes the function of the feature information creating unit 321 by executing the program stored in the recording medium, such as the ROM 102, RAM 103, HD 105, etc. shown in FIG. 1. The function of the feature information database 322 can be realized by the ROM 102 RAM 103, HD 105, etc. shown in FIG. 1.

Returning to FIG. 3, the filtering unit 323 filters out the feature information of the video shot $S_{i+2}$ corresponding to the commercials from the feature information stored in the feature information database 322. In particular, since the number of picture frames in a video shot S from a relay camera is likely to be far greater than that of any other program or commercials, the filtering unit 323 sets a predetermined threshold for the number of picture frames and, if the number of picture frames in a video shot S is less then the preset threshold, filters out the feature information pertaining to the video shot S. The video shot S is calculated as a difference between the last frame number and the first frame number. The CPU 101 realizes the function of the filtering unit 323 by executing the program stored in the recording medium, such as the ROM 102, RAM 103, HD 105, etc. shown in FIG. 1.

The similar-video-shot extracting unit 324 extracts the video shots S that are similar for each of the video shots split by the splitting unit 320. In particular, the similar-video-shot extracting unit 324 calculates the degree of similarity between one video shot S and rest of the video shots S with the aid of the feature information of each video shot S stored in the feature information database 322. The degree of similarity may for instance be the difference in the color information included in the feature information of the two video shots being compared.

The degree of similarity may also be the difference in the behavior information included in the feature information of the two video shots being compared. Alternatively, the degree of similarity may be a total of the differences in both the color information and the behavior information of the video shots being compared. The similar-video-shot extracting unit 324 extracts the video shots S that are within the predetermined degree of similarity as similar video shots Sr. The CPU 101 realizes the function of the similar-video-shot extracting unit 324 by executing the program stored in the recording medium, such as the ROM 102, RAM 103, HD 105, etc. shown in FIG. 1.

Figure 5:
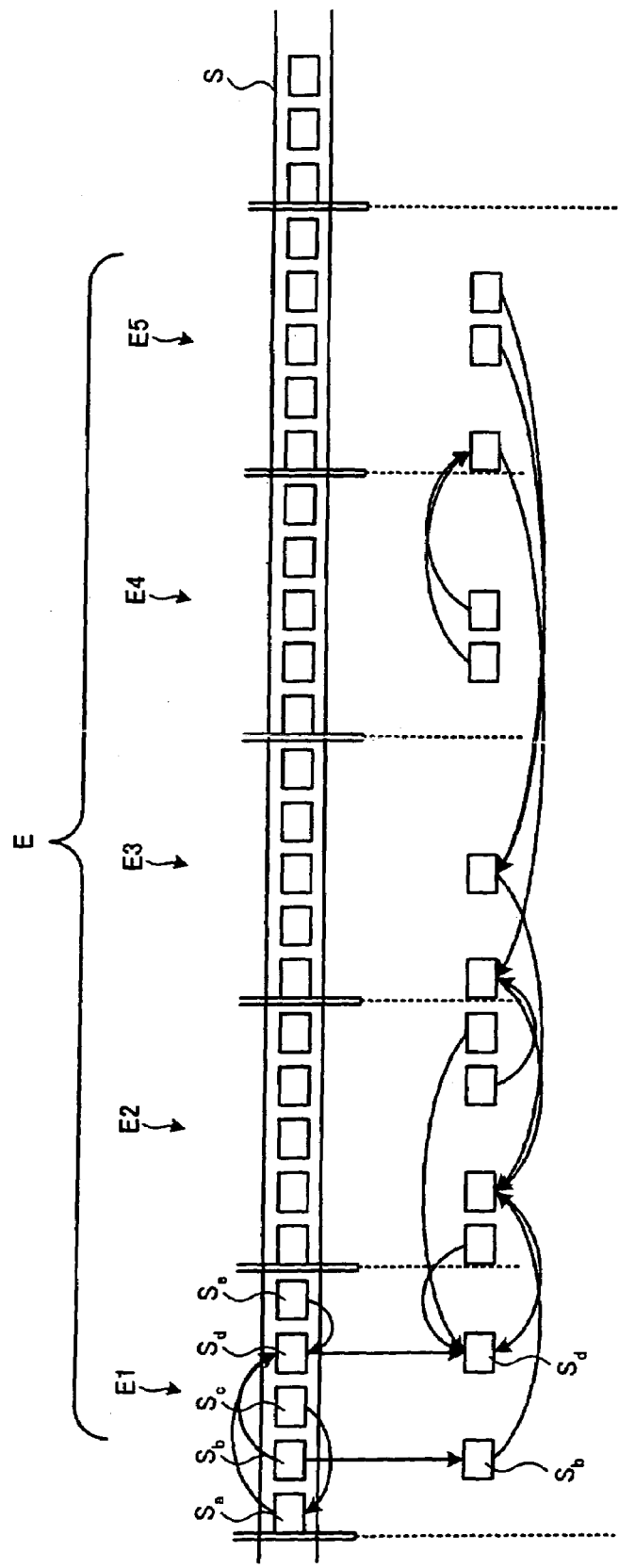
FIG. 5 is an example of extraction by the similar-video-shot extracting unit shown in FIG. 3.

A more specific example of extraction by the similar-video-shot extracting unit 324 is explained next. FIG. 5 is a more specific example of extraction by the similar-video-shot extracting unit 324. The similar-video-shot extracting unit 324 splits the continuous sequence of video shots S into a plurality of blocks E. Next, the similar-video-shot extracting unit 324 extracts the video shots S that are similar to one another from among the video shots S in each of the blocks E. For example, the similar video shot extracting unit 324 extracts the video shots Sb and Sd that are similar to one another from among the video shots Sa through Se in block E1.

The similar-video-shot extracting unit 324 calculates the degree of similarity between the video shots (such as Sb and Sd), which are extracted from any given block E (such as block E1), with the video shots S, which are extracted from the remaining blocks E. The similar-video-shot extracting unit 324 extracts similar video shots Sr for every video shot S extracted from each of the blocks E.

Thus, when extracting similar video shots Sr, the video shots S that do not bear any resemblance to any other video shot S can be filtered out by splitting a continuous sequence of video shots S into a plurality of blocks E. Consequently, the speed at which similar video shots Sr are extracted can be enhanced for a program having a considerable number of video shots S, such as a program of duration of over one hour.

The maximum-count-video-shot extracting unit 325 extracts a maximum count video shot Srm, which has the maximum number of similar video shots Sr extracted by the similar-video-shot extracting unit 324. If there is a plurality of extracted maximum count video shots Srm, any of the maximum count video shots Srm may be extracted. The CPU 101 can implement the function of the maximum-count-video-shot extracting unit 325 by executing the program stored in the ROM 102, RAM 103, HD 105, etc. shown in FIG. 1.

The representative-video-shot determining unit 326 includes a first representative-video-shot determining unit 341 and a second representative-video-shot determining unit 342. The first representative-video-shot determining unit 341 takes a representative video shot SD, which represents the content of the video, as the maximum count video shot Srm extracted by the maximum-count-video-shot extracting unit 325.

Based on an assessment result of the assessing unit 327, the second representative-video-shot determining unit 342 takes the representative video shot SD, which represents the video content of the video, as the maximum count video shot Srm extracted by the maximum-count-video-shot extracting unit 325. The CPU 101 can implement the function of the representative-video-shot determining unit 326 by executing the program stored in the ROM 102, RAM 103, HD 105, etc. shown in FIG. 1.

The assessing unit 327 assesses whether the maximum count video shot Srm extracted by the maximum-count-video-shot extracting unit 325 corresponds to the representative video shot SD determined by the first representative-video-shot determining unit 341 based on the number of video shots S similar to the maximum count video shot Srm extracted by the maximum-count-video-shot extracting unit 325 and the number of video shots S split by the splitting unit 320. In particular, the assessing unit 327 includes an appearance-ratio calculating unit 343, a ratio comparing unit 344, and a comparison result assessing unit 345.

The appearance-ratio calculating unit 343 calculates an appearance ratio using the number of video shots S split by the splitting unit 320 and the number of video shots S similar to the maximum count video shot Srm extracted by the maximum-count-video-shot extracting unit 325. For example, if the number of video shots S split by the splitting unit 320 is N, and the number of video shots S similar to the maximum count video shot Srm extracted by the maximum-count-video-shot extracting unit 325 is M, then the appearance ratio P=M/N.

The ratio comparing unit 344 compares the appearance ratio P calculated by the appearance-ratio calculating unit 343 with a predetermined appearance ratio Q. The comparison result assessing unit 345 assesses, based on the comparison result of the ratio comparing unit 344, whether the maximum count video shot Srm extracted by the maximum-count-video-shot extracting unit 325 corresponds to the representative video shot SD determined by the first representative-video-shot determining unit 341.

In particular, if the appearance ratio P is greater than the predetermined appearance ratio Q, the comparison result assessing unit 345 assesses that the maximum count video shot Srm extracted by the maximum-count-video-shot extracting unit 325 corresponds to the representative video shot SD determined by the first representative-video-shot determining unit 341. Otherwise, the comparison result assessing unit 345 assesses that the maximum count video shot Srm extracted by the maximum-count-video-shot extracting unit 325 does not correspond to the representative video shot SD determined by the first representative-video-shot determining unit 341.

The assessment result is output to the second representative-video-shot determining unit 342. If the maximum count video shot Srm extracted by the maximum-count-video-shot extracting unit 325 corresponds to the representative shot SD determined by the first representative shot determining unit 341, the second representative-video-shot determining unit 342 takes the maximum count video shot Srm extracted by the maximum-count-video-shot extracting unit 325 as the representative video shot SD.

In other words, the second representative-video-shot determining unit 342 upholds the decision of the first representative-video-shot determining unit 341. If the maximum count video shot Srm extracted by the maximum-count-video-shot extracting unit 325 does not correspond to the representative video shot SD determined by the first representative shot determining unit 341, the second representative-video-shot determining unit 342 does not take the maximum count video shot Srm as the representative video shot SD. The CPU 101 can implement the function of the assessing unit 327 by executing the program stored in the ROM 102, RAM 103, HD 105, etc. shown in FIG. 1.

Thus, if the representative-video-shot determining unit 326 can determine the representative video shot SD from a continuous sequence of video shots S, the video content is taken as portraying repeated video shots of the representative video shot SD or video shots similar to the representative video shot SD. A few examples of this type of video content include, for example, baseball, tennis, volleyball, sumo, boxing, professional wrestling, marathons, marathon relay races, etc.

On the other hand, if the representative-video-shot determining unit 326 is unable to determine a representative video shot SD from a continuous sequence of video shots S, the video content is taken as portraying video shots that are dissimilar to the video shot in the representative video shot SD. A few examples of this kind of video content are TV serials, news, variety programs, animations etc., in which the screen changes far more frequently as compared to a relay of sports events. Consequently, whether a sports event relay is being currently broadcast can be determined based on whether the representative video shot SD can be determined.

The video-content recognizing unit 328 recognizes the video content based on the video shot S of the representative video shot SD and new video shots S split by the splitting unit 320 after the determination of the representative video shot SD. In particular, the video-content recognizing unit 328 recognizes whether a new sequence of picture frames that have been input after the representative video shot SD has been determined has similar video content as that of the representative video shot SD. The video-content recognizing unit 328 includes a degree-of-similarity calculating unit 351, a shot-count finding unit 352, a graph creating unit 353, a shot-count comparing unit 354, and an assessment result output unit 355.

The degree-of-similarity calculating unit 351 calculates the degree of similarity between the video shot of the representative video shot SD and the new video shots S split by the splitting unit 320. In particular, when a new sequence of picture frames 200 is input after the representative video shot SD is determined, the splitting unit 320 splits the sequence of picture frames 200 into new video shots S. The feature information creating unit 321 creates feature information for the new video shots S and stores the feature information in the feature information database 322.

The degree-of-similarity calculating unit 351 calculates the degree of similarity between the video shot of the representative video shot SD and the new video shots S with the aid of the feature information stored in the feature information database 322. The degree of similarity may be, for example, the difference in the color information included in the feature information of the two video shots that are being compared. The degree of similarity may also be the difference in the behavior information included in the feature information of the two video shots that are being compared. Alternatively, the degree of similarity may be a total of the differences in both the color information and the behavior information of the video shots that are being compared. The similar-video-shot extracting unit 324 extracts the video shots S that are within the predetermined degree of similarity as similar video shots Sr.

Figure 6:
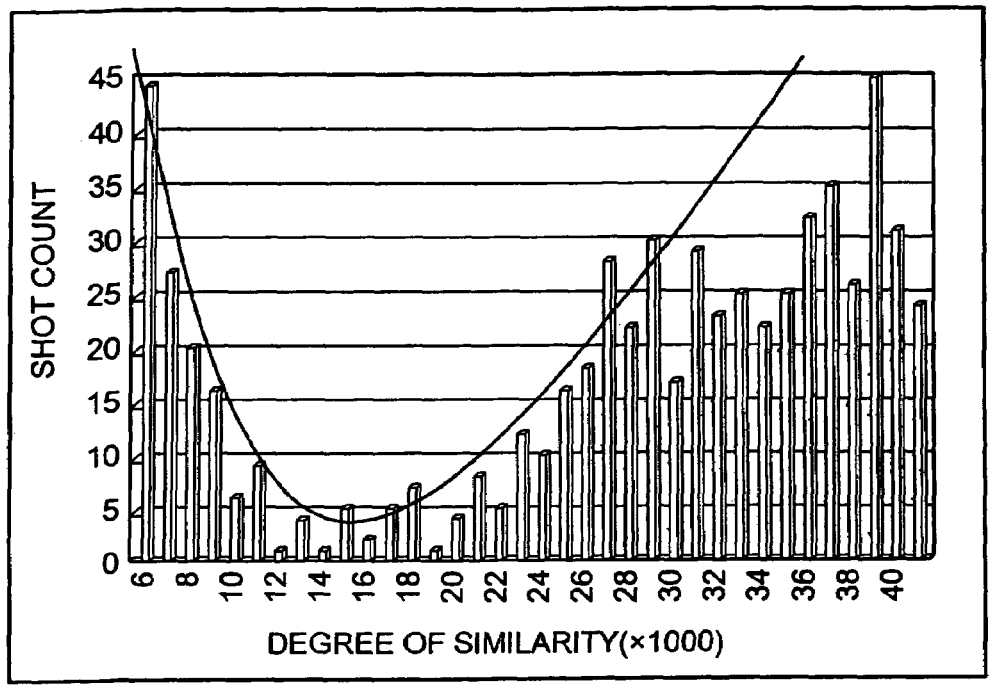
FIG. 6 is an example of a graph created by the graph creating unit shown in FIG. 3.
Figure 7:
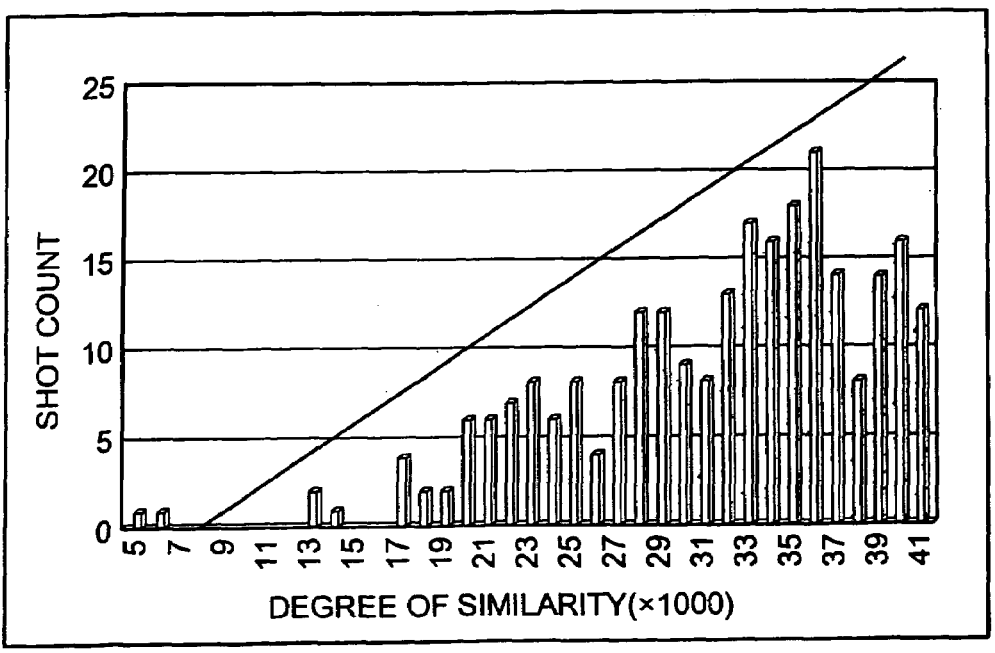
FIG. 7 is another example of a graph created by the graph creating unit shown in FIG. 3.

The shot-count finding unit 352 finds the shot count of the new video shots S for each degree of similarity calculated by the degree-of-similarity calculating unit 351. The graph creating unit 353 creates a graph that represents the detection result of the shot-count finding unit 352. The graph created by the graph creating unit 353 is explained next. FIG. 6 and FIG. 7 are examples of graphs created by the graph creating unit 353.

In FIG. 6 and FIG. 7, the degrees of similarity of the video shots S in comparison to the representative video shot SD and the shot count for each degree of similarity are represented in the form of a histogram and correlation function. The graph in FIG. 6 represents the video content of a baseball relay. The graph in FIG. 7 represents the video content of a TV serial. The X-axis represents the degrees of similarity of the new video shots S and the Y-axis represents the shot count of the new video shots for each degree of freedom. The shot count and the degree of similarity of the representative video shot SD is taken to be '0.'

In the graph shown in FIG. 6, the peak value (shot count '44') can be seen for the degree of similarity of '6000.' The degree of similarity corresponding to the peak value is the maximum value of the correlation function. From the peak value the shot count tends to reduce with an increase in the degree of similarity and reaches the minimum for the degree of similarity of '15000.' The shot count again tends to increase from the degree of similarity of '15000.' In the graph shown in FIG. 7, on the other hand, the shot count increases as the degree of similarity increases. In other words, the correlation function increases steadily.

The shot-count comparing unit 354 shown in FIG. 3 compares, based on the shape of the graph created by the graph creating unit 353, a predetermined shot count with the shot count corresponding to any random degree of similarity below the predetermined degree of similarity. Based on the comparison result, the shot-count comparing unit 354 determines whether the video content of the new sequence of picture frames that have been input after the representative video shot has been determined is similar to the video content of the representative video shot SD.

To explain more specifically, using the graph shown in FIG. 6, suppose the predetermined degree of similarity is '15000'—that is, the video content of the new sequence of picture frames is similar to the representative video shot SD if the degree of similarity is '15000' or less, and not similar if the degree of similarity is '16000' or more. And, assuming that the predetermined shot count is '20,' among the degrees of similarity that are less than '15000,' those that correspond to a shot count of '20' or more are '6000,' '7000,' and '8000.'

The determination of whether the video content of the new sequence of picture frames is similar to that of the representative video shot SD may be made either by the presence or absence of degrees of similarity corresponding to shot counts below a predetermined shot count or a degree of similarity. Alternatively, a total of the degrees of similarity corresponding to the shot counts greater than the predetermined shot count or a total of those shot counts themselves may be calculated and each compared with a preset threshold to determine whether the video content of the new sequence of picture frames is similar to that of the representative video shot SD.

Assuming that the determination is based on the presence or absence of degrees of similarity corresponding to the predetermined shot count of '20' in the example given above, since three degrees of similarity, namely, '6000', '7000', and '8000,' are found, the shot-count comparing unit 354 would recognize the video content of the new sequence of picture frames as being similar to that of the representative video shot SD.

The assessment result output unit 355 creates information pertaining to the assessment result (hereinafter, "assessment result information") of the shot-count comparing unit 354, and outputs the assessment result information to the recording control unit 305. The CPU 101 can implement the function of the video-content recognizing unit 328 by executing the program stored in the ROM 102, RAM 103, HD 105, etc. shown in FIG. 1.

Returning to FIG. 3, the recording-information input unit 303 receives input of recording information pertaining to any given program including, for example, the date of broadcasting, broadcasting start time, broadcasting channel, and broadcasting duration. G-code (registered trademark) and electronic program guides are examples of recording information. The electronic program guide can include listings of programs and information pertaining to them such as their date of broadcasting, broadcasting start time, broadcasting channel, broadcasting duration, whether likely to be extended broadcasting, if so, duration of extension, etc.

Apart from the G-code (registered trademark) and electronic program guide, a user can directly enter recording information for any program using operation keys or numeric keys. The function of the recording-information input unit 303 can be implemented by the remote control 114, the keyboard/mouse 115 shown in FIG. 1 (in addition to not shown input keys), by data input I/F 113, or the communication I/F 116.

The recording unit 304 records a program on a predetermined recording media. The recording unit 304 also plays back the video recorded on the recording media The function of the recording unit 304 can be implemented by the player/recorder 106 shown in FIG. 1. The function of the recording media can be implemented by the recording medium 107 or the HD 105 shown in FIG. 1.

The recording control unit 305 controls the recording unit 304 and records the program corresponding to the recording information input by the recording-information input unit 303. In particular, the recording control unit 305 starts up the recording unit 304 at the broadcasting start time on the date of broadcasting specified in the recording information and records the video, or more specifically, the sequence of picture frames 200, of the broadcasting channel specified in the recording information for the entire duration of the broadcast.

The recording control unit 305 controls the recording unit 304 and continues recording, suspends recording, or erases the video data recorded on the recording media based on the determination result of the representative-video-shot determining unit 326 and the recognition result of the video-content recognizing unit. When bad weather, such as rain, disrupts a baseball game, the broadcasting channel switches to some other program until the game resumes. Thus, during the recording of the baseball relay, if the representative-video-shot determining unit 326 can determine the representative video shot SD, based on the determination result of the representative-video-shot determining unit 326, the recording control unit 305 assesses that the relay is continuing and accordingly controls the recording unit 304 to continue recording.

On the other hand, if the representative-video-shot determining unit 326 cannot determine the representative video shot SD, the recording control unit 305 assesses that the relay is suspended and accordingly controls the recording unit 304 to suspend recording. The recording control unit 305 may also control the recording unit 304 to erase the recorded video. The CPU 101 can implement the function of the recording control unit 305 by executing the program stored in the ROM 102, RAM 103, HD 105, etc. shown in FIG. 1.

Figure 8:
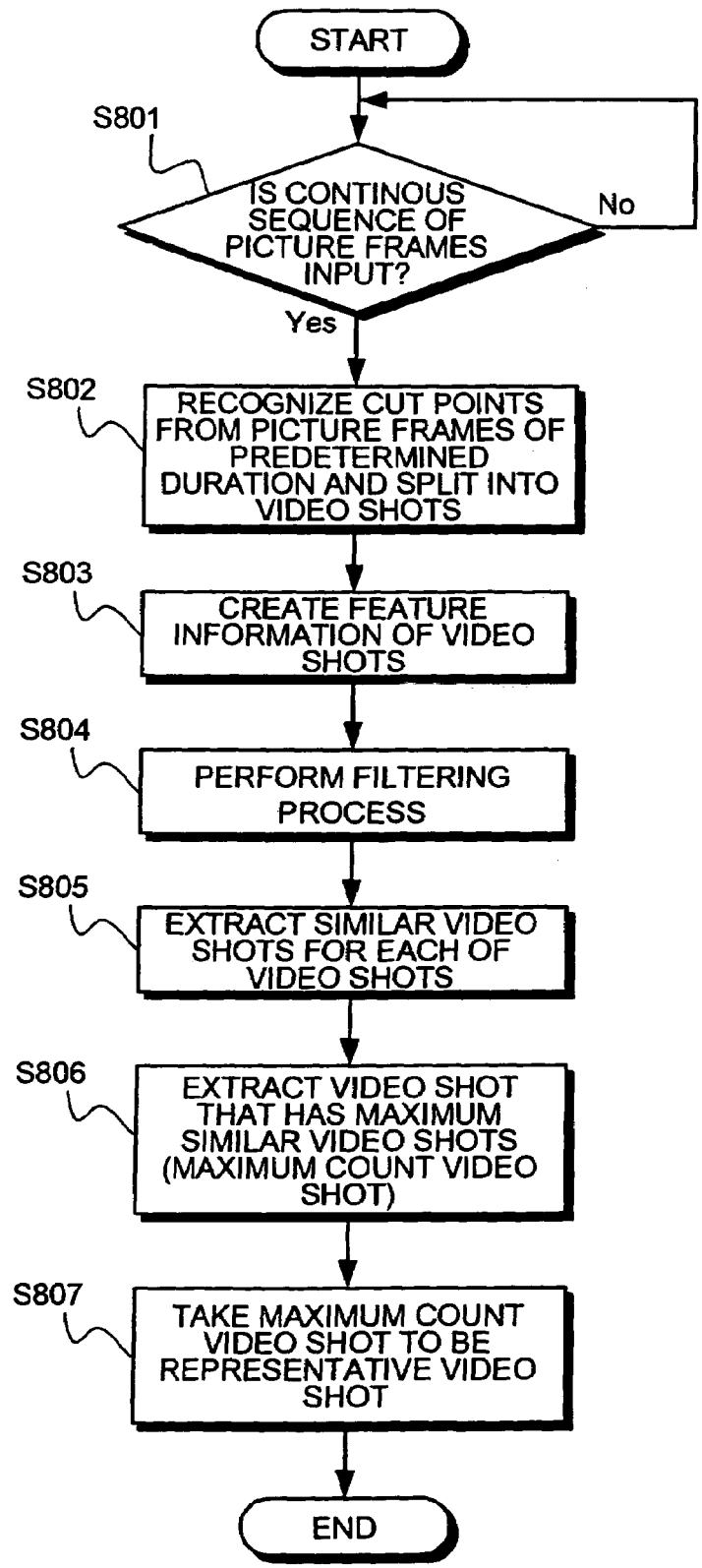
FIG. 8 is a flow chart of a representative video shot assessing process according to a first working example.

A first working example of the embodiment is explained next. The steps involved in the representative video shot assessing process by the video-content recognizing apparatus 302 according to the first working example will be explained now. FIG. 8 is a flow chart of a representative video shot assessing process according to the first working example.

When a continuous sequence of picture frames 200 of a predetermined duration is input ('YES' at Step S801), the cut points C are recognized in the picture frames 200, which split the picture frames 200 into video shots S (Step S802). The feature information indicating the feature of each of the video shots S is created (Step S803). The filtering process is performed for the feature information of each of the video shots S (Step S804).

The video shots similar to each of the video shots S (similar video shots Sr) are extracted from the feature information of each of the video shots S (Step S805). The shot counts of the similar video shots Sr are found, and the video shot that has the maximum count of similar video shots Sr (maximum count video shot Srm) is extracted (Step S806). The maximum count video shot Srm is taken to be the representative video shot SD that portrays the video content of the continuous sequence of picture frames 200 of a predetermined duration (Step S807).

According to the first working example, the representative video shot SD can be determined from the sequence of picture frames 200 having the video content of an actual broadcast. The recording apparatus can recognize the video of the program being broadcast from a more or less unchanging camera angle even if no video of the program intended for recognition is provided beforehand.

Figure 9:
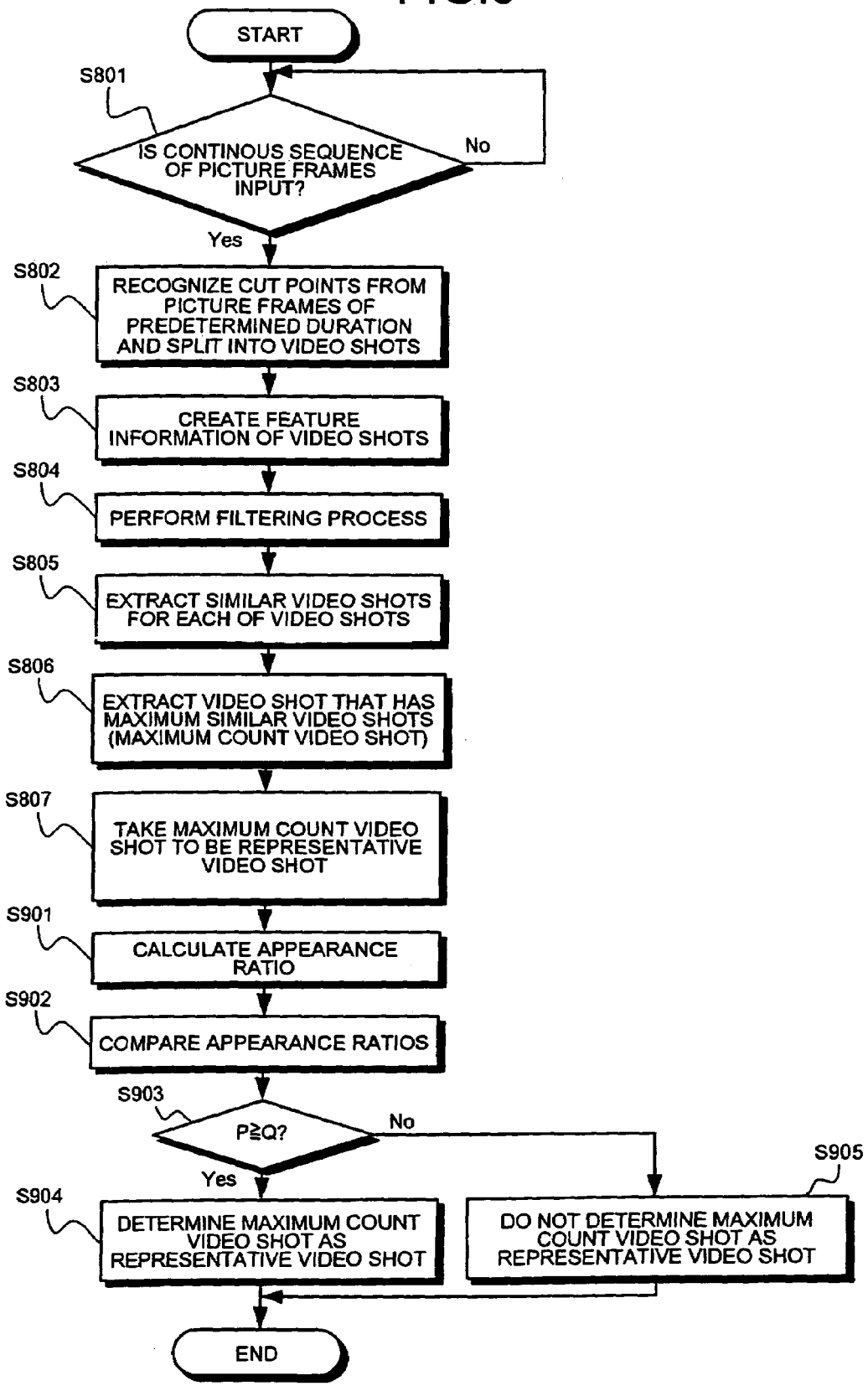
FIG. 9 is a flow chart of a representative video shot assessing process according to a second working example.

A second working example of the embodiment is explained next. The second working example pertains to a process of enhanced assessment accuracy of the representative video shot SD according to the first working example. FIG. 9 is a flow chart of the representative video shot determining process by the video-content recognizing apparatus 302 according to the second working example. The steps S801 through S807 are identical to those in FIG. 8 and hence are not explained here.

Once the maximum count video shot Srm is (tentatively) determined to be the representative video shot SD at Step S807, the appearance ratio P, which indicates the shot count of the video shots S that are similar maximum count video shot Srm, is calculated (Step S901). The calculated appearance ratio P is compared with a preset predetermined appearance ratio Q (Step S902).

If P is greater than or equal to Q ('YES' at Step S903), the maximum count video shot Srm is considered to be corresponding to the representative video shot SD, and the representative shot SD is determined (actual determination) to be the maximum count video shot Srm (Step S904). However, if P is less than Q ('NO' at Step S903), the maximum count video shot Srm is considered not to be corresponding to the representative video shot SD, and the maximum count video shot Srm is not determined to be the representative video shot SD (Step S905), thus, disqualifying the determination (tentative determination) made at Step S807.

According to the second working example, the maximum count video shot Srm is considered to be corresponding to the representative video shot SD only when the appearance ratio P of the shot count of the video shots similar to the maximum count video shot Srm is greater than a predetermined value. Thus, the recording apparatus recognizes with a high degree of accuracy the video being broadcast as the video from a more or less unchanging camera angle.

Figure 10:
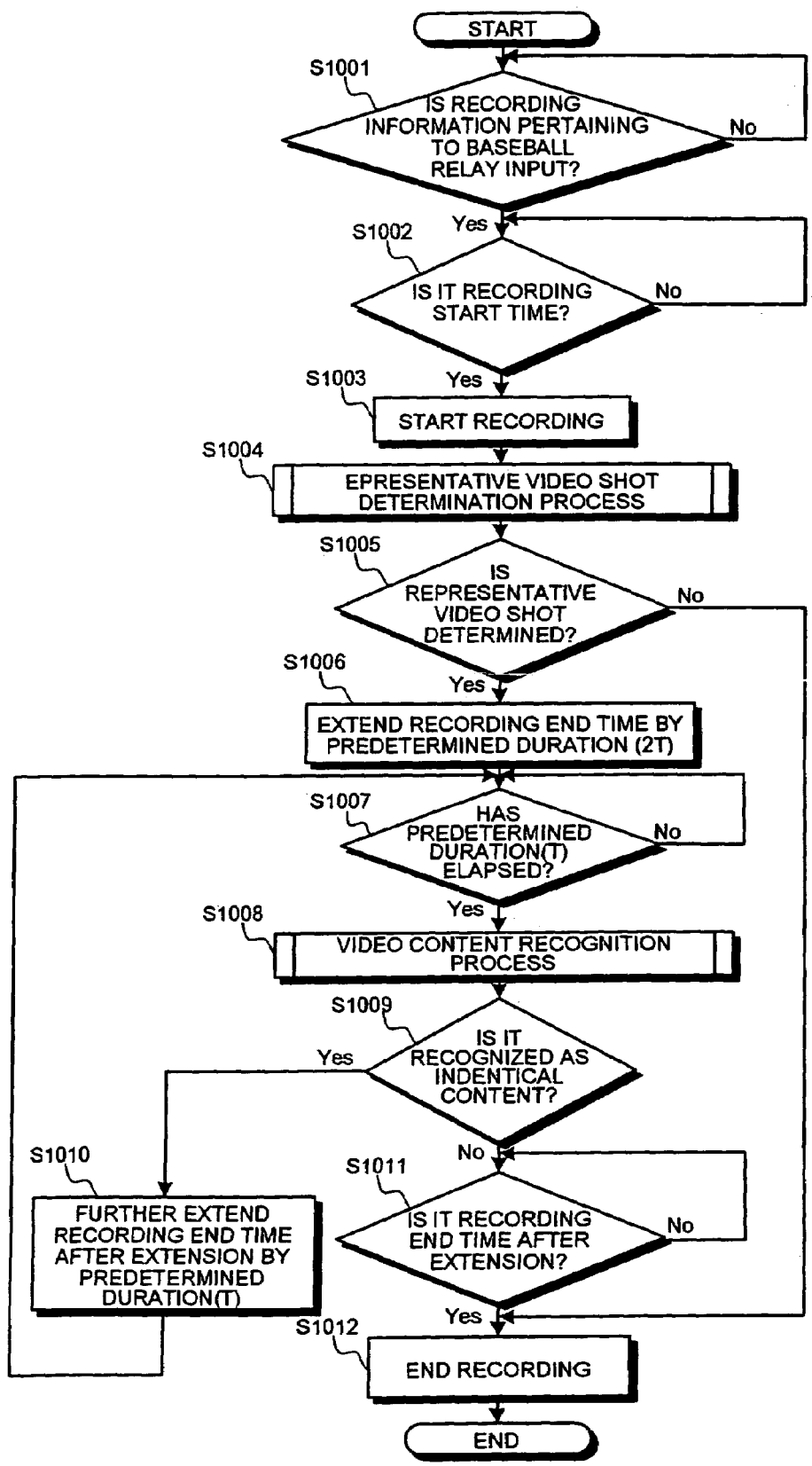
FIG. 10 is a flow chart of a recording process according to a third working example.

A third working example of the embodiment is explained next. The recording process of the recording apparatus 300 according to the third working example will be explained now. FIG. 10 is a flow chart of the recording process of the recording apparatus 300 according to the third working example. The program intended for recording is a baseball relay, the broadcast of which is likely to be extended beyond the scheduled broadcasting end time.

The recording information pertaining to the baseball relay is input 'YES' at Step S1001). When it is recording start time ('YES.' at Step S1002), the recording of the baseball relay is started (Step S1003). Next, the representative video shot SD determination process takes place (Step S1004). The representative-video-shot determination process is explained in the flow charts shown in FIG. 8 and FIG. 9 and hence is not explained here.

If after Step S1004, the representative video shot is determined ('YES' at Step S1005), the scheduled recording end time, which is calculated from the recording start time and the broadcasting duration, is extended by twice a predetermined duration T (e.g., 5 minutes), that is, the recording end time is extended by 2T (Step S1006). Once the predetermined duration T after the scheduled broadcasting end time has elapsed ('YES' at Step S1007), the video content recognition process is carried out (Step S1008). The video content recognition process is explained later.

If the video content of the continuous sequence of picture frames input during the extended duration, that is, during the predetermined duration T, is the same as that of the representative video shot SD ('YES' at Step S1009), the once-extended recording end time is further extended by the predetermined duration T (Step S1010). The process then returns to Step S1007.

If at Step S1009, the video content of the continuous sequence of picture frames is not recognized to be similar to that of the representative video shot SD ('NO' at Step S1009), once the predetermined duration T after the scheduled recording end time has elapsed ('YES' at Step S1011), the recording of the baseball relay is ended (Step S1012). Thus, even if the broadcasting the baseball relay is extended, the program can be recorded right up to the end.

If at Step S1005, the representative video shot SD cannot be determined ('NO' at Step S1005), it is taken as implying that an interruption has occurred in the baseball relay, such as due to rain, etc., and another program is being aired in its place. Consequently, the recording is ended (Step S1012). The ending of recording may be a mere stopping of the recording. If the recording medium is a video tape, the video tape may be rewound to the beginning of the recording after the recording has ended. If the recording medium is rewritable, such as a DVD+RW or DVD-RW, the recorded video may be erased. Thus, the user's editing work can be made more efficient.

Figure 11:
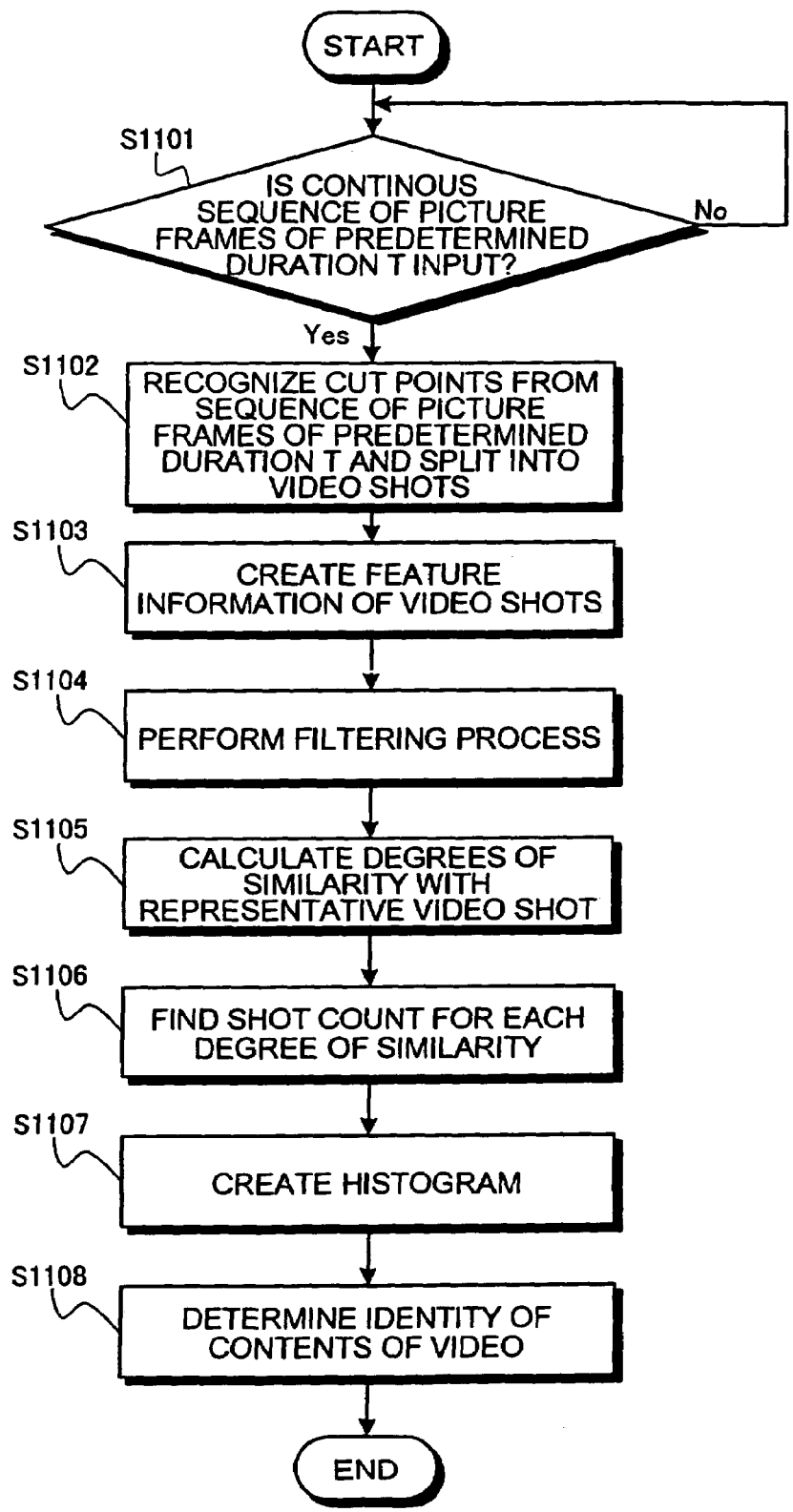
FIG. 11 is a detailed flow chart of the video content recognizing process shown in FIG. 10.

The video content recognition process (Step S1008) shown in FIG. 10 is explained next. FIG. 11 is a flow chart of the video content recognition process. When a continuous sequence of picture frames 200 of a predetermined duration T ('YES' at Step S1101), the cut points C, which split the picture frames into video shots S, are recognized in the picture frames 200 (Step S1102). The feature information is created for each of the split video shots S (Step S1103). The filtering process is performed for the feature information of the video shots S (Step S1104).

The degree of similarity is calculated between the representative video shot SD and each of the split video shots S based on the feature information of each video shot S (Step S1105). The shot count is found for each calculated degree of similarity (Step S1106). From the degrees of similarity and the shot count for each degree of similarity, a histogram is created that shows the distribution of shot count for each degree of similarity (See FIG. 6 and FIG. 7) (Step S1107).

From the created histogram, it is determined whether the video content of the continuous sequence of picture frames 200 input in the predetermined duration T is identical to that of the representative video shot SD (Step S1108). The information pertaining to the result of this determination is the recognition result of the video content.

Thus, according to the video content recognition process, it is possible to compare the representative video shot SD, which represents the video content of the program that is being broadcast, and the video content of the program currently being broadcast. Thus, it can be recognized whether a particular program with a more or less unchanging camera angle, such as a baseball relay, is continuing.

Figure 12:
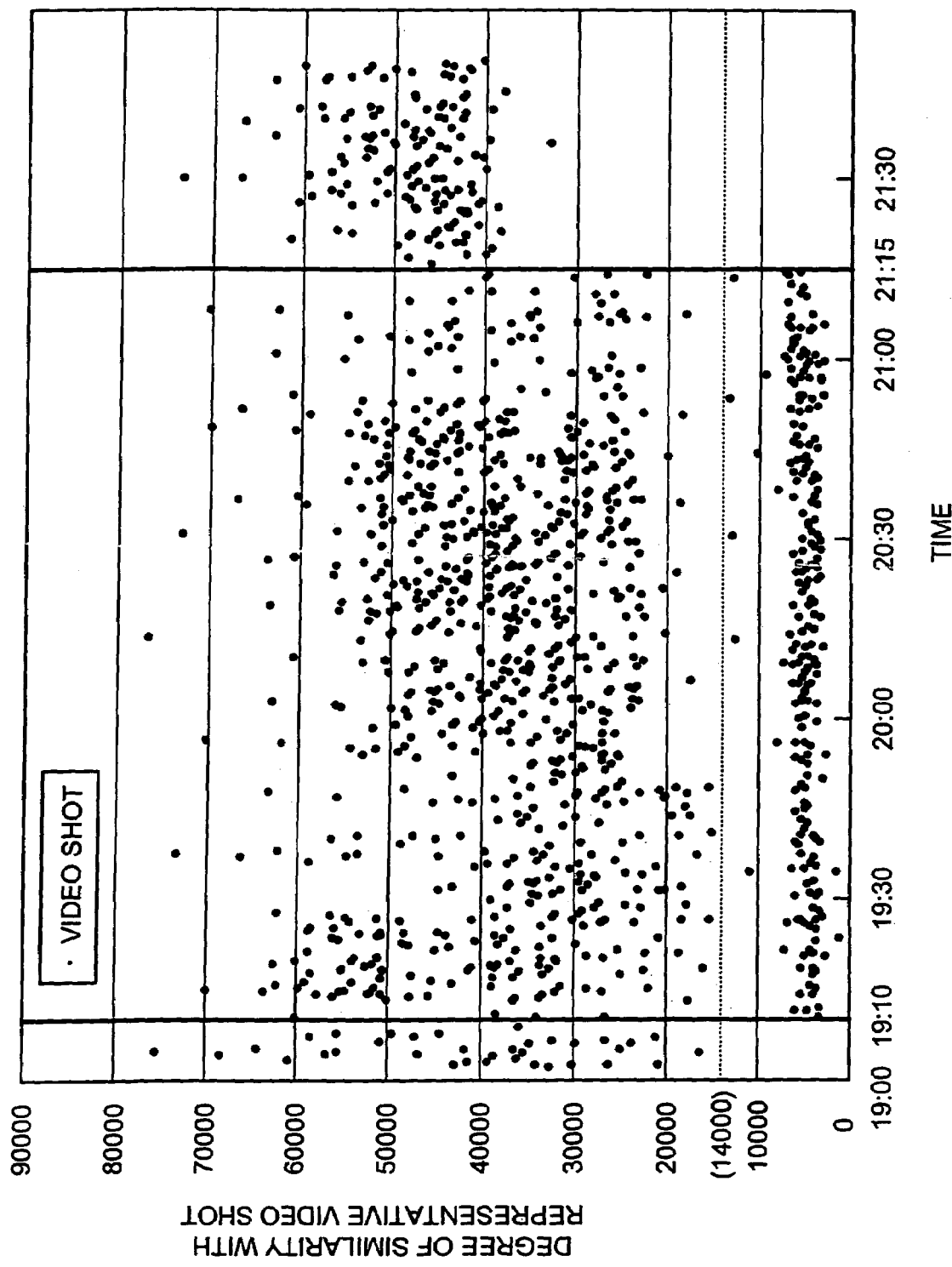
FIG. 12 depicts distribution of video shots during the elapsed time in the recording process according to the third working example.

The appearance distribution of the video shots S in the recording process during the elapsed period is explained next. FIG. 12 is a graph of the appearance distribution of the video shots during the elapsed time in the recording process. In the graph shown in FIG. 12, the video shots S are plotted of a baseball relay, the broadcast of which is likely to be extended.

In FIG. 12, the X-axis represents the elapsed time, and the Y-axis represents the degree of similarity with the representative video shot SD. The threshold degree of similarity for determining whether the video shot S is similar to the representative video shot SD is '14000.' Thus, if the degree of similarity is '14000' or less, the video shot S is similar to the representative video shot SD.

If the broadcasting start time of the baseball relay is 19:00 hours, and the broadcasting duration is 110 minutes, the scheduled broadcasting end time is estimated to be 20:50 hours. The representative video shot SD is determined from the sequence of picture frames being input from 19:00 hours to 19:10 hours. The representative video shot SD that is determined in this period is a video shot by a centrally located camera, as is the bulk of the baseball relay, such as the video shots $S_i$ shown in FIG. 2.

Once the representative video shot SD has been determined, after 19:10 hours, it is determined whether the baseball relay has continued based on the degree of similarity between the video shot S determined in the representative video shot SD and the video shot of a preset predetermined duration (e.g., 10 minutes' duration). In the graph shown in FIG. 12, the video shots S having a degree of similarity of less than '14000' appear even beyond 20:50 hours, indicating that there is an extension of the baseball relay. Since no video shots S having a degree of similarity of less than '14000' appear after 21:15 hours, it indicates that the baseball relay has ended at 21:15 hours.

Figure 13:
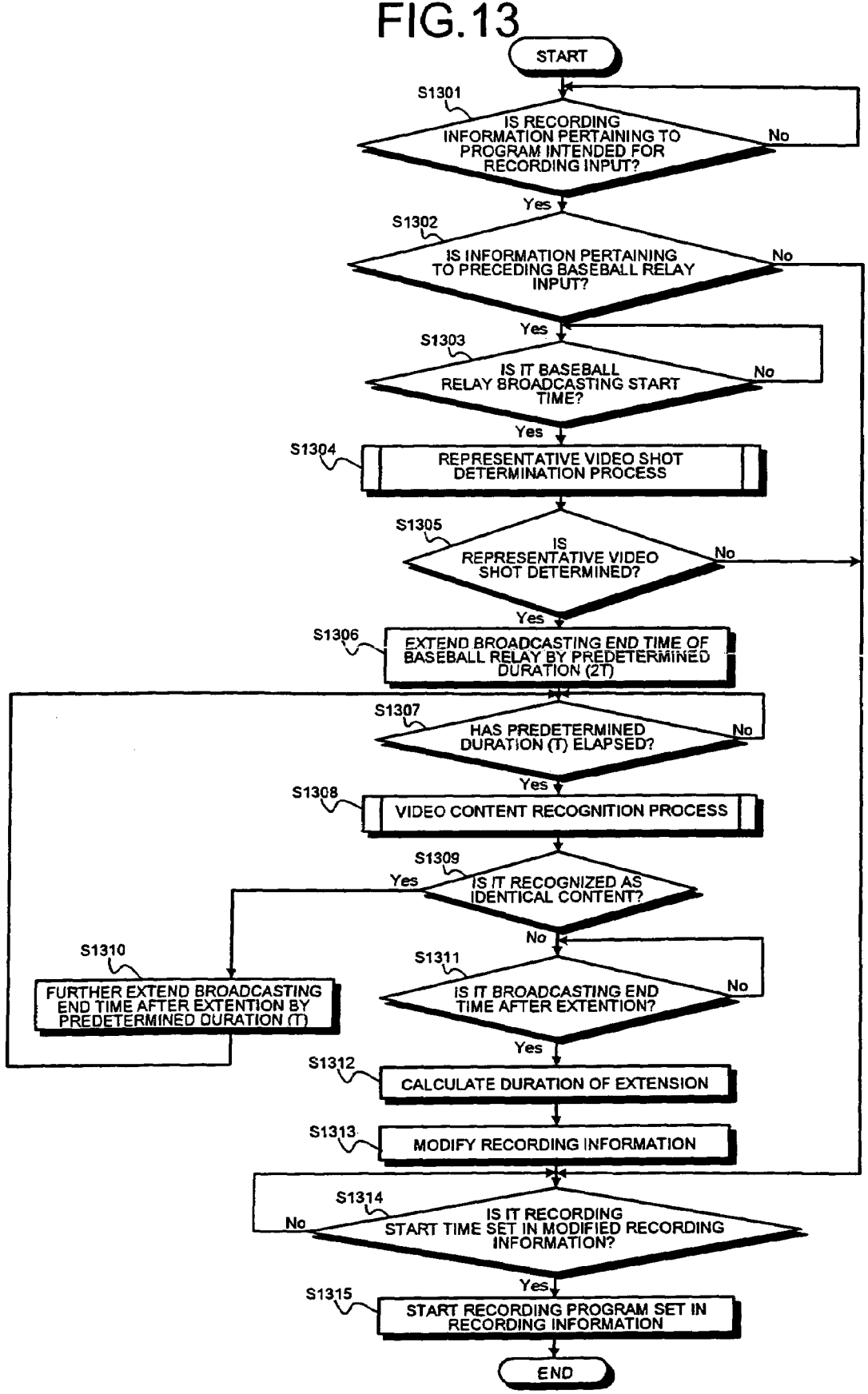
FIG. 13 is a flow chart of a recording process according to a fourth working example.

A fourth working example of the embodiment is explained next. Steps involved in a recording process of the recording apparatus 300 according to the fourth working example will be explained now. To be specific, the steps are explained of the recording process of a program preceded by another program that is likely to be extended beyond the scheduled broadcasting end time and whose video is shot from a more or less unchanging camera angle. FIG. 13 is a flow chart of the recording process of the recording apparatus 300 according to the fourth working example. The preceding program, which has the possibility of being extended, is taken as a baseball relay in this example.

Once the recording information pertaining to the program intended for recording is input ('YES' at Step S1301), it is determined whether information pertaining to the preceding baseball relay is input (Step 51302). If no information pertaining to the preceding baseball relay is input ('NO' at Step S1302), the process directly proceeds to Step S1314.

If information pertaining to the preceding baseball relay is input ('YES' at Step S1302), at the broadcasting start time ('YES' at Step S1303), the sequence of picture frames portraying the video content of the baseball relay is accepted, and the representative-video-shot determination process is performed (Step S1304). The representative-video-shot determination process is explained in the flow charts shown in FIG. 8 and FIG. 9 and hence is not explained here.

If the representative video shot SD is determined ('YES' at Step S1305) at the end of Step S1304, the broadcasting end time of the baseball relay is extended by twice a predetermined duration T (e.g., 5 minutes), that is, the broadcasting end time is extended by 2T (Step S1306). Once the predetermined duration after the scheduled recording end time has elapsed ('YES' at Step S1307), the video content recognition process is carried out (Step S1308). The video content recognition process is explained in the flow chart shown in FIG. 11 and hence is not explained here.

If the video content of the continuous sequence of picture frames input during the extended duration, that is during the predetermined duration T, is the same as that of the representative video shot SD ('YES' at Step S1309), the once-extended broadcasting end time is further extended by the predetermined duration T (Step S1310). The process then returns to Step S1307.

If at Step S1309 the video content of the sequence of picture frames is not recognized to be similar to that of the representative video shots SD ('NO' at Step S1309), then once the predetermined duration T after the scheduled broadcasting end time has elapsed ('YES' at Step S1311), the duration by which the baseball relay is extended is calculated (Step S1312). The duration of extension can be calculated from the difference between the extended broadcasting end time and the scheduled broadcasting end time.

The duration of extension is added to the recording start time and the broadcasting duration of the program intended to be recorded, thus modifying the recording information of the program intended to be recorded (Step S1313). At the recording start time as per the modified recording information ('YES' at Step S1314), the recording of the program set in the recording information is started (Step S1315). Thus, even if the preceding program is extended, the intended program can be recorded completely from start to finish by merely calculating the duration of extension of the preceding program.

If at Step S1305, the representative video shot SD cannot be determined ('NO' at Step S1305), it is taken as implying that an interruption has occurred in the baseball relay, such as due to rain, etc., and another program, which does not have an unchanging camera angle, is being aired in its place. Thus, at the recording start time as per the recording information input at Step S1301 (Step S1314), the recording of the program set in the recording information is started.

Thus, even if a program preceding the program intended to be recorded is likely to be extended beyond the scheduled broadcasting end time, the intended program can be recorded completely from start to finish, regardless of whether the preceding program was extended or the duration of the extension.

Figure 14:
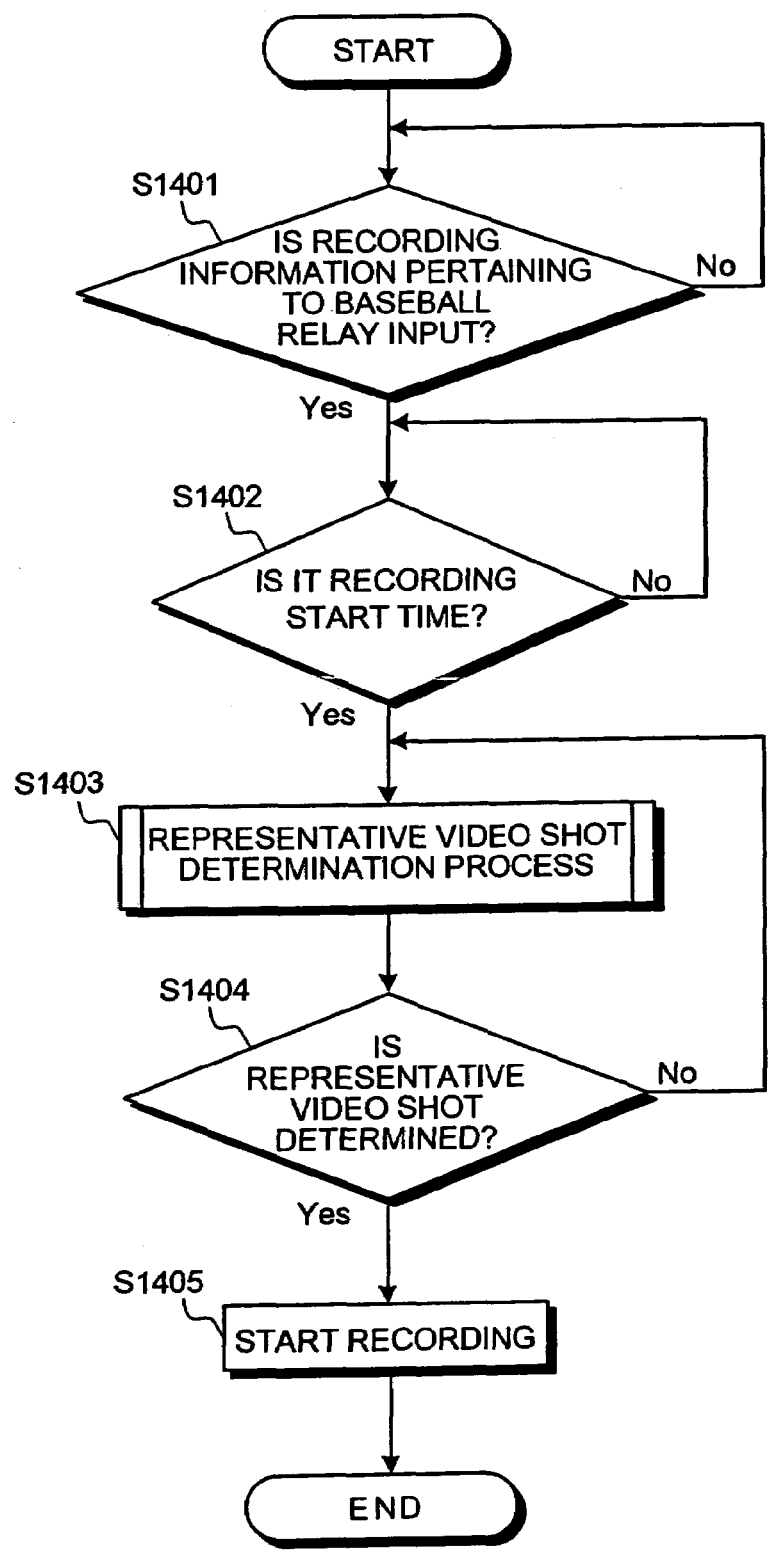
FIG. 14 is a flow chart of a recording process according to a fifth working example.

A fifth working example according to the embodiment is explained next. The steps of a recording process of the recording apparatus 300 according to the fifth working example will be explained now. The recording process explained here involves delaying the recording start time in order to record only the actual program. For instance, in the baseball relay shown in the graph in FIG. 12, the initial two minutes of the baseball relay are usually shots that one may not want to record, such as shots of the baseball field, scoreboard, on-the-spot report, commentators, briefings and highlights of earlier matches, etc. Even if pitching shots are aired, there may be superimposed text, such as the title of the program, interspersed with the pitching shots. Thus, a representative video shot (pitching shot) determining process is carried out for two minutes from the broadcasting start time 19:00 hours to 19:02 hours. FIG. 14 is a flow chart of yet another recording process (Step S1403, explained later) of the recording apparatus 300.

The recording information pertaining to the baseball relay is input ('YES' at Step S1401). At the recording start time ('YES' at Step S1402), the representative-video-shot determination step is carried out (Step S1403). The determination step representative video shot SD is explained in the flow chart shown in FIG. 8 and FIG. 9, and hence is not explained here. If no representative video shot is determined ('NO' at Step S1404), the determination process of the representative video shot SD is carried out again (Step S1403). If the representative video shot is determined ('YES' at Step S1404), the recording is started (Step S1405).

According to the present working example, recording does not commence until the representative video shot is determined. Consequently, recording of inessential shots can be avoided, and only the actual program is recorded. As a result, the user can start viewing the recording of the program (the baseball relay) directly without having to go through the trouble of fast-forwarding to the beginning of the program.

According to the video-content recognizing apparatus 302 and the recording apparatus 300, no data for recognition needs to be provided beforehand as the representative video shot SD can be extracted from the video shots S themselves that are intended to be recognized. Consequently, it is possible to obviate the data for video recognition and the resulting maintenance of data.

Since the representative video shot SD is extracted from the video shots S themselves that are intended to be recognized, even when the venue of the game, the uniforms of the teams, or the screen layout of the broadcasting station changes, recognition can still take place, which enhances the accuracy of the detection.

By executing a ready program, a personal computer or a workstation can be used to implement the video content recognizing method and the recording method according to an embodiment of the present invention. The computer may load the program from a computer-readable recording medium such as the hard disk, flexible disk, CD-ROM, MO, DVD, and the like. The program may also be distributed via a network, such as the Internet.

The present document incorporates by reference the entire contents of Japanese priority document, 2004-012404 filed in Japan on Jan. 20, 2004.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for recognizing contents of a video made of picture frames, the apparatus comprising:
   a splitting unit that splits the picture frames into a plurality of sets of video shots based on cut points, each cut point indicating a change of screen;
   a similar-video-shot extracting unit that extracts similar video shots that are similar to each of the video shots from among the sets of video shots;
   a maximum-count-video-shot extracting unit that counts a number of similar video shots for each of the video shots and extracts a maximum count video shot that has a maximum count of the similar video shots;
   a representative-video-shot determining unit that takes the maximum count video shot as a representative video shot representing contents of the video;
   an assessing unit that assesses whether the maximum count video shot extracted by the maximum-count-video-shot extracting unit corresponds to the representative video shot determined by the representative-video-shot determining unit based on a count of the similar video shots that are similar to the maximum count video shot and a count of a first set of video shots, wherein
   the assessing unit includes:
      an appearance-ratio calculating unit that calculates an appearance ratio between a shot count of similar video shots that are similar to the maximum count video shot and the shot count of the first set of video shots; and
      an appearance-ratio comparing unit that compares the appearance ratio calculated by the appearance-ratio calculating unit with a predetermined appearance ratio, and
   the assessing unit assesses whether the maximum count video shot corresponds to the representative video shot based on a comparison result of the appearance-ratio comparing unit; and
   a second representative-video-shot determining unit that takes the representative video shot as the maximum count video shot based on an assessment result of the assessing unit.

2. An apparatus for recognizing contents of a video made of picture frames, the apparatus comprising:
   a splitting unit that splits the picture frames into a plurality of sets of video shots based on cut points, each cut point indicating a change of screen;
   a similar-video-shot extracting unit that extracts similar video shots that are similar to each of the video shots from among the sets of video shots;
   a maximum-count-video-shot extracting unit that counts a number of similar video shots for each of the video shots and extracts a maximum count video shot that has a maximum count of the similar video shots;
   a representative-video-shot determining unit that takes the maximum count video shot as a representative video shot representing contents of the video;
   a video-content recognizing unit that recognizes whether video content of a second sequence of picture frames is similar to video content of the representative video shot, wherein
   the splitting unit splits the second sequence of picture frames into a second set of video shots that include picture frames delimited by cut points that each indicate a change of screen,
   the video-content recognizing unit recognizes whether the video content of the second sequence of picture frames is similar to the video content of the representative video shot based on video shot of the representative video shot and the second set of video shots,
   the video-content recognizing unit includes:
      a degree-of-similarity calculating unit that calculates a degree of similarity between the video shot of the representative video shot and each of the second set of video shots; and
      a shot-count finding unit that finds a count of the second set of video shots for each degree of similarity calculated by the degree-of-similarity calculating unit, and
   the video-content recognizing unit recognizes whether the video content of the second set of video shots is similar to the video content of the representative video shot based on a result of the shot-count finding unit.

3. The video-content recognizing apparatus according to claim 2, wherein
   the video-content recognizing unit further includes a graph creating unit that creates a graph that represents the result of the shot-count finding unit, and the video-content recognizing unit recognizes whether the video content of the second set of video shots is similar to the video content of the representative video shot based on a shape of the graph created by the graph creating unit.

4. The video-content recognizing apparatus according to claim 3, wherein the video-content recognizing unit further includes a shot-count comparing unit that compares a shot count corresponding to a degree of similarity below a predetermined degree of similarity to a predetermined shot count based on the shape of the graph created by the graph creating unit, and the video-content recognizing unit recognizes whether the video content of the second set of video shots is similar to the video content of the representative video shot based on a comparison result of the shot-count comparing unit.

5. A recording apparatus comprising:

a video-content recognizing apparatus for recognizing contents of a video made of picture frames, the video-content recognizing apparatus including:

a splitting unit that splits the picture frames into a plurality of sets of video shots based on cut points, each cut point indicating a change of screen;

a similar-video-shot extracting unit that extracts similar video shots that are similar to each of the video shots from among the sets of video shots;

a maximum-count-video-shot extracting unit that counts a number of similar video shots for each of the video shots and extracts a maximum count video shot that has a maximum count of the similar video shots; and a representative-video-shot determining unit that takes the maximum count video shot as a representative video shot representing the contents of the video;

a recording-information input unit that receives an input of recording information including date of broadcasting, broadcasting start time, and broadcasting duration of a program intended for recording;

a recording unit that records a video of a program; and a recording control unit that controls the recording unit and records a video of a program set in the recording information input by the recording-information input unit, wherein the video-content recognizing apparatus determines a representative video shot representing video content of a program set in the recording information based on a sequence of picture frames portraying the content of the program, and the recording control unit ends a recording set in the recording information based on a result of representative-video-shot determination by the video-content recognizing apparatus.

6. A recording apparatus comprising:

a video-content recognizing apparatus for recognizing contents of a video made of picture frames, the video-content recognizing apparatus including:

a splitting unit that splits the picture frames into a plurality of sets of video shots based on cut points, each cut point indicating a change of screen;

a similar-video-shot extracting unit that extracts similar video shots that are similar to each of the video shots from among the sets of video shots;

a maximum-count-video-shot extracting unit that counts a number of similar video shots for each of the video shots and extracts a maximum count video shot that has a maximum count of the similar video shots;

a representative-video-shot determining unit that takes the maximum count video shot as a representative video shot representing the contents of the video; and a video-content recognizing unit that recognizes whether the-video content of a second sequence of picture frames is similar to the video content of the representative video shot, wherein the splitting unit splits the second sequence of picture frames into a second set of video shots that include picture frames delimited by cut points that each indicate a change of screen, and the video-content recognizing unit recognizes whether the video content of the second sequence of picture frames is similar to the video content of the representative video shot based on the video shot of the representative video shot and the second set of video shots;

a recording-information input unit that receives an input of recording information including date of broadcasting, broadcasting start time, and broadcasting duration of a program intended for recording;

a recording unit that records a video of a program; and a recording control unit that controls the recording unit and records video of a program set in the recording information input by the recording-information input unit, wherein the video-content recognizing apparatus determines a representative video shot representing video content of a program set in the recording information based on the first sequence of picture frames portraying the content of the program, and the recording control unit records the second sequence of picture frames that are input within a predetermined duration after a broadcasting duration of the program set in the recording information has elapsed if the video-content recognizing apparatus is able to determine the representative video shot representing the program set in the recording information.

7. The recording apparatus according to claim 6, wherein the video-content recognizing apparatus recognizes the video content of the second sequence of picture frames based on the video shot of the second sequence of pictures frames recorded by the recording control unit within the predetermined duration after the broadcasting duration has elapsed and based on the video shot of the representative video shot representing the program set in the recording information, and the recording control unit extends further the recording of the program set in the recording information by a predetermined duration based on a recognition result of the video content portraying the second sequence of picture frames.

8. The recording according to claim 7, wherein the recording control unit ends the recording of the program set in the recording information if the video content portraying the second sequence of picture frames is different from the video content of the representative video shot.

9. A recording apparatus comprising:

a video-content recognizing apparatus for recognizing contents of a video made of picture frames, the video-content recognizing apparatus including:

a splitting unit that splits the picture frames into a plurality of sets of video shots based on cut points, each cut point indicating a change of screen;

a similar-video-shot extracting unit that extracts similar video shots that are similar to each of the video shots from among the sets of video shots;

a maximum-count-video-shot extracting unit that counts a number of similar video shots for each of the video shots and extracts a maximum count video shot that has a maximum count of the similar video shots; and a representative-video-shot determining unit that takes the maximum count video shot as a representative video shot representing the contents of the video;

a recording-information input unit that receives an input of recording information including date of broadcasting, broadcasting start time, and broadcasting duration of a program intended for recording;

a recording unit that records a video of a program; and a recording control unit that controls the recording unit and records a video of the program set in the recording information input by the recording-information input unit, wherein the recording-information input unit additionally receives an input of program information pertaining to a program preceding a program intended for recording, the video-content recognizing apparatus determines a representative video shot representing a video content of the program preceding the program intended for recording based on a sequence of picture frames portraying a content of a program input by the recording-information input unit, and the recording control unit changes the recording information based on a result of a representative video shot determination by the video-content recognizing apparatus.

* * * * *